(12) United States Patent
Baumgartner et al.

(10) Patent No.: US 6,500,888 B2
(45) Date of Patent: Dec. 31, 2002

(54) SURFACE TREATMENT OF ETHYLENE BASED POLYMER PELLETS TO IMPROVE BLOCKING RESISTANCE

(75) Inventors: Steven G. Baumgartner, Oxford, PA (US); Bruce M. Hasch, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/749,093

(22) Filed: Dec. 27, 2000

(65) Prior Publication Data

US 2002/0123547 A1 Sep. 5, 2002

(51) Int. Cl.$^7$ .................................................. C08K 5/04
(52) U.S. Cl. ......................... 524/394; 524/399; 524/400
(58) Field of Search ................................. 524/394, 399, 524/400

(56) References Cited

U.S. PATENT DOCUMENTS

| | | |
|---|---|---|
| 3,528,841 A | 9/1970 | Donaldson et al. |
| 3,753,965 A | 8/1973 | Looney et al. |
| 3,969,304 A | 7/1976 | Pugh et al. |
| 4,510,281 A | 4/1985 | Smith |
| 4,769,289 A | 9/1988 | Kelly et al. |
| 4,897,437 A | 1/1990 | McKinney et al. |
| 5,286,771 A | 2/1994 | Smith |

FOREIGN PATENT DOCUMENTS

JP            85-23449       2/1985

OTHER PUBLICATIONS

Donald L. Brebner, "Troubleshooting heat seal layers of "Surlyn" ionomer resin", Heat Seal Layers of "Surlyn", received date: May 5, 2000.
Robert T. Van Ness, "Heat seal performance", Heat Seal Layers of "Surlyn", received date: May 5, 2000.

*Primary Examiner*—Edward J. Cain
(74) *Attorney, Agent, or Firm*—Kevin S. Dobson

(57) ABSTRACT

This invention is directed to ethylene based copolymer pellets having an acid content at least 5% by weight and having an effective amount of a surface coating to increase the stick temperature of the copolymer above 25° C.;

wherein the ethylene based copolymer comprises repeating polymerized units of
(d) at least 50% by weight, based on the weight of the copolymer, of ethylene,
(e) 5 to 30% by weight, based on the weight of the copolymer, of acrylic acid or methacrylic acid; and
(f) up to 40% by weight, based on the weight of the copolymer, of an alkyl acrylate or an alkyl methacrylate, wherein the copolymer has 0–100% of the acid groups neutralized with metal ion selected from the following group: zinc, magnesium, sodium and lithium and the surface coating comprises an effective amount of a metal salt of an aliphatic acid having 12 to 22 carbon atoms, generally in an amount of 25 to 6,000 ppm (parts per million).

17 Claims, No Drawings

SURFACE TREATMENT OF ETHYLENE BASED POLYMER PELLETS TO IMPROVE BLOCKING RESISTANCE

BACKGROUND OF THE INVENTION

This invention is directed to ethylene based polymer pellets that have resistance to blocking under storage conditions and under conventional operating temperatures used to process the polymer pellets.

Polymer pellets after manufacturing and during shipment and subsequent handling, such as when the pellets are charged into an extruder for further processing to form articles, need to remain free flowing and not stick together or agglomerate at conventional storage, shipping and operating temperatures. Additives that reduce blocking or sticking can be melt blended into the polymer before it is pelletized or an additive can be applied to the surface of the pellet. In either case, the additive should remain effective from the time the pellet is formed to when the customer uses the pellet. The additive must not cause operability problems in equipment during handling either while the pellet is being formed, conveyed, packaged or in the customer's plant. The additive must not negatively affect the end use properties of the product and must meet food regulations in the event the product is used, for example, for food packaging.

Donaldson et al., U.S. Pat. No. 3,528,841, issued Sep. 15, 1970 shows the use of a copolymer of ethylene oxide and propylene oxide on polymeric pellets to reduce tackiness. Pugh et al., U.S. Pat. No. 3,969,304 issued Jul. 13, 1976 shows the use of slip agents for polyethylene films of various inorganic powders and organic materials such as erucamides, oleamides, sulfonates, stearates, stearamides, and the like. Kelly et al., U.S. Pat. No. 4,769,289 issued Sep. 6, 1988 shows the use of fumed silica on polar ethylene interpolymers to form free flowing polymer particles.; Smith, U.S. Pat. No. 5,286,771 issued Feb. 15, 1994 shows various alcohols, ethers, alkylene oxide polymers, and oils as additives to reduce blocking of polymer pellets. Japanese Patent Kokia Patent No. Sho 60(1985)-23449 published Feb. 2, 1985 shows the use of an alkali metal salt of a higher aliphatic acid having 8–22 carbon atoms or an ester of such an acid to reduce the adhesion problems of thermoplastic resin particles or pellets. However, none of these patents are concerned with reducing the blocking of pellets of ethylene based copolymers having a relatively high acid content, for example, polymers having an acid content of 5–30% by weight.

This invention effectively reduces blocking of pellets of relatively high acid containing ethylene based polymers by increasing the stick temperature of the polymer.

SUMMARY OF THE INVENTION

This invention is directed to ethylene based copolymer pellets having an acid content at least 5% by weight and having an effective amount of a surface coating to increase the stick temperature of the copolymer above 25° C.;
  wherein the ethylene based copolymer comprises repeating polymerized units of
    (a) at least 50% by weight, based on the weight of the copolymer, of ethylene,
    (b) 5 to 30% by weight, based on the weight of the copolymer, of acrylic acid or methacrylic acid; and
    (c) up to 40% by weight, based on the weight of the copolymer, of an alkyl acrylate or an alkyl methacrylate, wherein the copolymer has 0–100% of the acid groups neutralized with metal ion selected from the following group: zinc, magnesium, sodium and lithium and the surface coating comprises an effective amount of a metal salt of an aliphatic acid having 12 to 22 carbon atoms, generally in an amount of 25 to 6,000 ppm (parts per million).

DETAILED DESCRIPTION OF THE INVENTION

The ethylene based relatively high acid containing copolymer pellets of this invention are free flowing and can be transported and processed using conventional equipment without blocking or sticking of the copolymer pellets. An effective amount of a metal salt of an aliphatic acid having 12–22 carbon atoms is deposited on the polymer pellets to prevent blocking and raises the stick temperature of the pellets above 25° C. Even small increases in the stick temperature above 25° C. can be highly desirable for many of the operations involved in the production, handling, shipping and storage of polymer pellets. Preferably, the stick temperature is increased to 30–60° C. One particular advantage of the above coating of the metal salt is that it is a tenacious coating and a sufficient amount of the coating is retained during subsequent processing, shipping and storage of the pellets to maintain an effective stick temperature that prevents blocking or agglomeration of the pellets.

The word "copolymer" as used herein embraces a polymer formed with two or more monomers.

The "stick temperature" is the maximum temperature at which all of the polymer pellets empty from a test apparatus in less than one minute following a hold up under fixed conditions. To measure the stick temperature, polymer pellets are placed in a vertical tube having an inside diameter of 3.9 cm and a length of 23.2 cm lined loosely with a 5 mil (127 micron) thick film of Mylar® polyethylene terephthalate. A 4086 g weight is placed on top of the pellets so that the downward pressure is 33.5 kPa. Hot air is passed upward through the pellets at 30 L/min for 15 minutes followed by ambient temperature air at 130 L/min for 5 minutes. The weight is then removed and the tube is inverted. Time during which all of the pellets flow out of the tube is noted. The test is repeated at gradually increasing temperatures until a point is reached when only a portion of the copolymer pellets or none of the pellets flow out of the tube. The stick temperature is the last temperature at which all of the pellets flow out in less than one minute.

Typical metal salts of an aliphatic acid having 12–22 carbon atoms that are used in this invention are calcium, sodium, magnesium and zinc salts. Examples of such salts are calcium laurate, zinc laurate, sodium laurate, magnesium laurate, calcium oleate, sodium oleate, magnesium oleate, zinc oleate, calcium palmitate, sodium palmitate, magnesium palmitate, zinc palmitate, calcium behenate, sodium behenate, magnesium behenate and zinc behenate.

Preferred metal salts used in this invention are metal stearates, such as calcium stearate, sodium stearate, magnesium stearate and zinc stearate. Calcium stearate is particularly preferred since it is an excellent anti-blocking agent, meaning it raises the stick temperature of the acid containing copolymer to a desired level. Also, calcium stearate is readily available and can be formed into an aqueous dispersion that preferably is used in the process of this invention for coating copolymer pellets.

Typical ethylene based copolymers of this invention are ethylene/acid copolymers and ethylene/acid/alkyl(meth) acrylate copolymers containing 5–30% by weight of polymerized acid monomers such as acrylic acid or methacrylic acid. Copolymers having an acid content of 5% or greater often have a stick temperature below 25° C. Generally, polymers having an acid content above 30% are not made.

The term alkyl(meth)acrylate as used herein refers to alkyl esters of acrylic acid and methacrylic acid.

Ethylene based copolymers of this invention contain at least 50% of polymerized ethylene, 5 to 30% by weight of a polymerized acid constituent such as acrylic or methacrylic acid and 0 to 40% by weight of a polymerized alkyl (meth)acrylate. This invention is particularly applicable to but not limited to ethylene/acid copolymers containing 75–85% by weight ethylene and 15–25% by weight of acrylic acid or methacrylic acid, such as an ethylene (81%)/methacrylic acid (19%) copolymer, an ethylene(85%)/methacrylic acid(15%) copolymer and an ethylene(80%)/acrylic acid (20%) copolymer.

Other useful copolymers contain at least 50% and preferably, 65 to 85% by weight polymerized ethylene, 15 to 25% by weight acrylic or methacrylic acid and 5–30% by weight of an alkyl (meth)acrylate. Typical of such copolymers are ethylene/methacrylic acid/n-butyl acrylate having a weight ratio of components of 67.5/9/23.5.

The copolymers also include ionomers in which up to about 100%, preferably 5 to 70% of the acid groups are neutralized with a metallic ion selected from the following group: zinc, magnesium, sodium and lithium.

These ethylene based copolymers typically have a melt index (MI) of 0.5 to 2000, preferably, 1 to 1000 g/10 minutes determined by ASTM D 1238 using condition E (2190 g, 190° C.)

While neutralization somewhat affects the stick temperature of the copolymer, zinc ionomers generally are more prone to blocking in comparison to lithium, sodium and magnesium ionomers. A coating is required on copolymer pellets to increase the stick temperature to form pellets that do not block under normal use conditions.

There are a number of other factors that have an affect on the stick temperature of copolymer pellets such as surface roughness, pellet dimensions and shape that may be affected by the particular type of cutter used to form the pellets. When a pellet surface is nonroughened, sticking will increase due to increased contact area. When the surface is slightly roughened, stick temperature may increase. Pellets obtained immediately after pelletization have a nonroughened surface and also have low block resistance due to the high pellet to pellet contact.

During the production of copolymer pellets, in the various blending, screening and conveying operations, pellets are subjected to various degrees of surface modification by abrasion and roughening. Generally, there is an increase in stick temperature after these processes and stick temperatures can increase as much as 10° C. However, such methods of roughening that inherently occur are generally not of much utility since control is difficult and results vary. Attempts to roughen pellets in a controlled manner by passing them over a very rough surface have not produced a reliable and consistent increase in stick temperature. Any roughening operation generates very small polymer particles or fines that promote blocking and are disadvantageous in later polymer processing.

Just allowing the pellets to stand or "age" can cause a change in the stick temperature. Changes in surface crystallinity and other surface changes occur but vary from polymer to polymer.

The copolymer pellets of this invention are of the normal size. A broad range is from 0.4 to 18 g/100 pellets, typically 1 to 5 g/100 pellets and usually 2 to 4 g/100 pellets. Pellet size does not directly affect this invention. Smaller pellets can be cooled more rapidly than larger pellets but tend to block more readily. This is an inherent feature of pellets and not directly related to this invention.

The copolymer pellets are coated with an effective amount of the aforementioned metal salt to prevent blocking of the pellets during handling, shipping and processing. Generally, 25 to 6,000 ppm (parts per million of polymer) of the metal salt are used and preferably, 50 to 2,500 ppm are used.

The metal salt also can be applied to the copolymer pellets by any of a variety of conventional techniques. One technique is to immerse the pellets in an aqueous dispersion of the metal salt for 0.5 to 30 minutes and then remove and dry the pellets, for example, by blowing ambient air, typically at temperatures of 20 to 30° C., through the pellets until dry. Other techniques that can be used are to spray the pellets with an aqueous dispersion of the metal salt while agitating the pellets and then drying the pellets as above.

An aqueous dispersion of one of the metal salts typically contains a surfactant to disperse the metal salt in an aqueous medium and is formed using conventional techniques known to those skilled in the art.

The metal salt can be applied as a powder to the copolymer pellets. A metal salt, such as calcium stearate in the form of a fluffy powder is blended with polymer pellets until a coating is formed on the pellets using typical milling or mixing techniques.

Any of the above methods to apply the metal salt to the copolymer pellets can be carried out in a batch process or in a continuous process.

The use of the aforementioned metal salt improves blocking resistance and increases the stick temperature of the copolymer pellets but does not adversely affect other properties of the ethylene based copolymer such as its heat sealing characteristics, does not increase haze of the copolymer significantly, and does not cause the copolymer to yellow on exposure. The moisture content of the copolymer pellets does not increase with the use of the metal salt.

The following examples illustrate the invention. All parts, ratios and percentages are on a weight basis unless otherwise indicated. MI (melt index) and ST (stick temperature) of the copolymers were determined as described above.

EXAMPLES

Example 1

This is a comparative example that was conducted that compares conventional blocking agents to a metal salt of an aliphatic carboxylic acid having 12–22 carbon atoms, calcium stearate, and the affect on stick temperature of the copolymer pellets. In each case, unroughened pellets of the following copolymer were used: E/MAA copolymer (ethylene/methacrylic acid, weight ratio 81/19), melt index of 60 (g/10 min), having a stick temperature of 27° C. In each of the following cases, the additive was applied in the same manner. The copolymer pellets were immersed in an aqueous dispersion of the particular additive and then the pellets were dried with ambient air and the stick temperature was determined. In each case, 5000 ppm (parts per million) based on the copolymer, of the additive were deposited on the copolymer pellets. The results of this comparison are as follows:

| Additive | ST Stick Temperature (° C.) | Increase in ST (° C.) |
|---|---|---|
| Synpro ® CaSt 15 (Calcium Stearate) | >61.9° C. | >34.9° C. |
| Synpro ® CaSt 15 | >60° C. | >33° C. |
| Kemamide ® W-20 (Ethylene bis oleamide) | 40.5–43.0° C. | 13.5–16.5° C. |
| Paraflint ® H1N5 (Fischer-Tropsch Wax - a paraffin type wax) | 38.7–39.3° C. | 11.7–12.3° C. |
| Paraflint ® H1N5 | 39° C. | 12° C. |
| Microthene ® FN 500 (Fine low density polyethylene) | 43.1–43.5° C. | 16.1–16.5° C. |
| Microthene ® FN 500 | 41–42° C. | 14–15° C. |

The above results show that calcium stearate provides a surprising improvement in the stick temperature of the copolymer pellets in the range of 2–3 times that which is provided by the conventional additives of ethylene bis oleamide, Fischer-Tropsch Wax and fine low density polyethylene.

Example 2

This example shows different levels of calcium stearate deposited onto pellets of the copolymer described in Example 1 and the resulting change in stick temperature of the copolymer. Also, this example compares the stick temperature of coated pellets before and after roughening of the pellets. The calcium stearate was applied using the same procedure as used in Example 1 to coat the pellets. Calcium stearate was applied to unroughened pellets and the stick temperature was measured and then the pellets were roughened by tumbling in a container and the stick temperature of the roughened pellets was measured. The results of this example are shown as follows:

| Calcium Stearate Additive Level (ppm) | Unroughened Pellets Stick Temperature ° C. | Roughened Pellets Stick Temperature ° C. |
|---|---|---|
| 0 | 26.7 | — |
| 100 | 48.2 | 43.5 |
| 500 | 45 | 46 |
| 1000 | 45 | 43 |
| 2500 | 42 | 46 |

The above data shows that there was a significant increase in Stick Temperature of the unroughened copolymer pellet after the application of 100–2500 ppm of calcium stearate. These pellets after the roughening procedure retained the improved stick temperature showing that conventional usage such as packaging, shipping and subsequent handling which would cause roughening of the pellets did not remove the calcium stearate coating from the pellets.

The uncoated pellets and each of the coated pellets were each molded into plaques and measured for haze. There was a increase in haze from about 1–6% along with the rise in the level of calcium stearate additive but when the pellets were melt mixed in an extruder and then formed into plaques, no difference in haze was noted between the calcium stearate treated copolymers and untreated copolymers.

Example 3

In this example, calcium stearate was applied to a variety of copolymer pellets wherein some copolymers contained an acid constituent and other copolymers did not contain such an acid constituent and the stick temperature was measured before treatment with calcium stearate and after treatment and the rise in the stick temperature was noted. The application of the calcium stearate to the copolymer pellets followed the procedure of Example 1. The results are shown as follows:

| Copolymer Composition | ST - Untreate Pellets (° C.) | Calcium Stearate (ppm) | ST - Treated Pellets (° C.) | ST - Rise (° C.) |
|---|---|---|---|---|
| E/MAA Ratio 81/19 MI 60 | 27 | 100 | 46 | 19 |
| E/MAA Ratio 85/15 MI 60 | 37 | 100 | 50 | 13 |
| E/AA Ratio 80/20 MI 300 | 30 | 500 | 45 | 15 |
| E/MAA/n-BA Ratio 67.5/9/23.5 MI 0.6 and 50% Zn neutralized | 20 | 100 | 37 | 17 |
| E/MAA/n-BA (described above) | 20 | 1000 | 49–52 | 29–32 |
| E/VA/CO Ratio 66/24/10 MI 35 | 42 | 1000 | 47 | 5 |
| E/VA Ratio 72/28 MI 150 | 42 | 500 | 44 | 2 |
| E/n-BA/GMA Ratio 66.75/28/5.25 MI 12 | 45 | 1000 | 46 | 1 |
| E/MA Ratio 68/32 MI 20 | <22 | 1000 | <22 | 0 |

Abbreviations used above: E - ethylene, MAA - methacrylic acid, AA - acrylic acid, n-BA - n-butyl acrylate, VA - vinyl acetate, CO - carbon monoxide, GMA - glycidyl methacrylate, MA - methyl acrylate The above results show that pellets of polymers containing acrylic acid or methacrylic acid have a substantial rise in stick temperature when coated with calcium stearate. Pellets of copolymers that did not contain an acid constituent when coated with calcium stearate either did not have a rise in stick temperature or the rise was only slight.

Example 4

The copolymer pellets described in Example 1 were coated using the process of Example 1 except that the pellets were coated with 100 ppm calcium stearate and roughened by tumbling. Then the stick temperature was measured and was 43.5° C. The pellets were allowed to stand 41 days at ambient temperatures and the stick temperature was again measured and was 47.8° C. This data showed that aging of the copolymer pellets did not decrease but even slightly increased the effect of the calcium stearate treatment.

Example 5

Pellets of a copolymer of E/MAA/n-BA, ratio 67.5/9/23.5 having a melt index of 1.0 and 50% neutralized with Mg was coated with 100 ppm calcium stearate using a commercial process in which the pellets were melt extruded, cut into pellets and passed through a shaker. The stick temperature was measured before the pellets were processed and was 24–25° C. and then measured after being treated with calcium stearate in the commercial process. The stick temperature had increased to >43° C. This illustrates that application of calcium stearate by a commercial process does increase the stick temperature significantly.

What is claimed is:

1. Ethylene based copolymer pellets having an acid content at least 5% by weight and having an effective amount of a surface coating to increase the copolymer stick temperature above 25° C.;
   wherein the ethylene copolymer comprises repeating polymerized units of
   (a) at least 50% by weight, based on the weight of the copolymer, of ethylene,
   (b) 5 to 30% by weight, based on the weight of the copolymer, of an ethylenically unsaturated acid selected from the group consisting of acrylic acid and methacrylic acid; and
   (c) up to 40% by weight, based on the weight of the copolymer, of an alkyl (meth)acrylate,
   wherein the copolymer has 0–100% of the acid groups neutralized with metal ion selected from the group consisting of zinc, magnesium, sodium and lithium and the surface coating comprises an effective amount of a metal salt of an aliphatic acid having 12 to 22 carbon atoms to increase the stick temperature to above 25° C.

2. The copolymer pellets of claim 1 having a surface coating consists of a metal salt of an aliphatic acid having 12 to 22 carbon atoms in an amount of 25 to 6,000 ppm (parts per million).

3. The copolymer pellets of claim 2 in which the metal portion of the metal salt is selected from the group consisting of calcium, sodium, magnesium and zinc.

4. The copolymer pellets of claim 3 in which the copolymer has a stick temperature is in the range of 30 to 60° C. and the copolymer has a melt index of 0.5 to 2000 g/10 minutes determined according to ASTM D 1238 Condition E and the coating consists of a metal salt selected from the group consisting of calcium stearate, sodium stearate, magnesium stearate and zinc stearate.

5. The copolymer pellets of claim 4 comprising 15–25% by weight of acrylic acid or methacrylic acid and 75–85% by weight ethylene and having a surface coating consisting of calcium stearate in an amount of 50–2,500 ppm (parts per million).

6. The copolymer pellets of claim 5 in which 5–70% by weight of the acid groups are neutralized with metal ion selected from the group consisting of zinc, magnesium, sodium and lithium.

7. The copolymer pellets of claim 4 comprising 15–25% by weight of acrylic acid or methacrylic acid, 5–30% alkyl(meth)acrylate and 65–85% by weight ethylene and having a surface coating consisting of calcium stearate in an amount of 50–2,500 ppm (parts per million).

8. The copolymer pellets of claim 7 in which 5–70% by weight of the acid groups are neutralized with metal ion selected from the group consisting of zinc, magnesium, sodium and lithium.

9. The copolymer pellets of claim 1 having a surface coating consisting of calcium stearate in an amount of 50–2,500 ppm and a stick temperature of 30 to 60° C. and the copolymer comprising 15–25% by weight of acrylic acid or methacrylic acid and 75–85% by weight ethylene and the copolymer having a melt index of 0.5 to 2000 g/10 minutes determined according to ASTM D 1238 Condition E.

10. The copolymer pellets of claim 9 in which 5–70% by weight of the acid groups are neutralized with metal ion selected from the group consisting of zinc, magnesium, sodium and lithium.

11. The copolymer pellets of claim 1 having a surface coating consisting of calcium stearate in an amount of 50–2,500 ppm and a stick temperature of 30 to 60° C. and the copolymer comprising 15–25% by weight of acrylic acid or methacrylic acid, 5–30% by weight of an alkyl(meth) acrylate and 65–85% by weight ethylene and the copolymer having a melt index of 0.5 to 2000 g/10 minutes determined according to ASTM D 1238 Condition E.

12. The copolymer pellets of claim 11 in which 5–70% by weight of the acid groups are neutralized with metal ion selected from the group consisting of zinc, magnesium, sodium and lithium.

13. A process for forming free flowing ethylene based copolymer pellets which comprises applying an effective amount of a surface coating comprising a metal salt of an aliphatic acid having 12 to 22 carbon atoms to the polymer pellets to increase the stick temperature to above 25° C.;
   wherein the ethylene based copolymer comprises repeating polymerized units of
   (a) at least 50% by weight, based on the weight of the copolymer, of ethylene,
   (b) 5 to 30% by weight, based on the weight of the copolymer, of an ethylenically unsaturated acid selected from the group consisting of acrylic acid and methacrylic acid; and
   (c) up to 40% by weight, based on the weight of the copolymer, of an alkyl (meth)acrylate,
   wherein the copolymer has 0–100% of the acid groups neutralized with metal ion selected from the group consisting of zinc, magnesium, sodium and lithium.

14. The process of claim 13 in which the metal salt is applied to the copolymer pellets from an aqueous dispersion and the resulting coated pellets are dried with blown air at ambient temperature.

15. The process of claim 13 in which the metal salt is applied to the copolymer pellets in the form of a powder and thoroughly mixed with the pellets to coat the pellets.

16. The process of claim 13 in which the metal salt is selected from the group consisting of calcium stearate, sodium stearate, magnesium stearate and zinc stearate and the coating of the metal stearate being applied in an amount of 25–6,000 ppm (parts per million).

17. The process of claim 13 in which the metal salt consists of calcium stearate and a coating of calcium stearate is applied in an amount of 50–2,500 ppm (parts per million) to increase the copolymer stick temperature to 30 to 60 ° C. and wherein the ethylene copolymer has a melt index of 0.5 to 2000 g/10 minutes determined according to ASTM D 1238 condition E.

* * * * *